(12) United States Patent
Hegar et al.

(10) Patent No.: US 10,735,338 B2
(45) Date of Patent: Aug. 4, 2020

(54) ENCODER-SENSITIVE STREAM BUFFER MANAGEMENT

(71) Applicant: Amazon Technologies, Inc., Seattle, WA (US)

(72) Inventors: Ryan Paul Hegar, Happy Valley, OR (US); Trevor Wells, Washougal, WA (US); Brian Lewis, Portland, OR (US); Jeffrey Lassahn, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/378,364

(22) Filed: Apr. 8, 2019

(65) Prior Publication Data

US 2019/0238475 A1 Aug. 1, 2019

Related U.S. Application Data

(63) Continuation of application No. 15/199,327, filed on Jun. 30, 2016, now Pat. No. 10,257,107.

(51) Int. Cl.
*H04L 12/24* (2006.01)
*H04L 12/875* (2013.01)
*H04L 29/06* (2006.01)
*H04L 12/46* (2006.01)
*H04L 12/811* (2013.01)
*H04L 12/835* (2013.01)

(52) U.S. Cl.
CPC .......... *H04L 47/56* (2013.01); *H04L 12/4633* (2013.01); *H04L 47/30* (2013.01); *H04L 47/38* (2013.01); *H04L 65/4069* (2013.01); *H04L 65/4084* (2013.01); *H04L 65/607* (2013.01); *H04L 65/608* (2013.01); *H04L 65/80* (2013.01); *H04L 69/161* (2013.01)

(58) Field of Classification Search
None
See application file for complete search history.

(56) References Cited

U.S. PATENT DOCUMENTS

| | | | |
|---|---|---|---|
| 2002/0138635 A1 | 9/2002 | Redlich et al. | |
| 2006/0146815 A1* | 7/2006 | Tse | H04L 7/0331 370/389 |
| 2007/0130393 A1* | 6/2007 | Versteeg | H04L 47/10 710/57 |
| 2012/0014490 A1* | 1/2012 | Pollock | H04L 7/0083 375/362 |
| 2014/0003238 A1* | 1/2014 | Finkelstein | H04L 47/52 370/235 |
| 2015/0131744 A1 | 5/2015 | Samuelsson et al. | |
| 2015/0264404 A1 | 9/2015 | Hannuksela | |
| 2015/0281713 A1 | 10/2015 | Suzuki et al. | |
| 2015/0373373 A1 | 12/2015 | Wang | |

(Continued)

*Primary Examiner* — Brandon M Renner
(74) *Attorney, Agent, or Firm* — Davis Wright Tremaine LLP

(57) ABSTRACT

An encoding or transcoding system uses hypothetical reference decoder occupancy data to at least calculate parameters for output buffers for data streams. An output thread receives HRD buffer occupancy data and calculates buffer occupancy based on duration, rather than absolute occupancy, and correlates the HRD buffer occupancy data with target durations for buffered packets prior to release from the buffer.

20 Claims, 8 Drawing Sheets

(56) References Cited

U.S. PATENT DOCUMENTS

2015/0382050 A1\* 12/2015 Le Nerriec ............ H04L 45/16
　　　　　　　　　　　　　　　　　　　　　725/80
2017/0111415 A1　　4/2017　Bao et al.
2017/0125126 A1　　5/2017　Nishimura et al.

\* cited by examiner

ENCODER-SENSITIVE STREAM BUFFER MANAGEMENT

CROSS REFERENCE TO RELATED APPLICATIONS

This application claims priority to and is a continuation of U.S. patent application Ser. No. 15/199,327, filed Jun. 30, 2016, entitled "ENCODER-SENSITIVE STREAM BUFFER MANAGEMENT," which is incorporated by reference for all purposes.

BACKGROUND

Increasingly, high-resolution media, such as video and audio, is being streamed from remote websites, and consumed by users through their electronic devices. However, the transport of high-resolution media from one endpoint to another is both resource-intensive and sensitive to timing precision. Additionally, many transport mechanisms, such as the User Datagram Protocol (UDP), used for the dissemination of such high-resolution media, lack guaranteed ordering, or delivery of the constituent packets. Also, the media streams themselves may include constituent images or segments that are considerably larger in data size than other portions of the streams. These factors combined can make accurate sizing and utilization of buffers difficult, both from the perspective of optimization of resource utilization, and from the perspective of providing a consistent, interruption free user experience to consumers of the outgoing media stream. For example, underallocation of an output buffer would incur a risk of buffer underflow or overflow, while overallocation of an output buffer would increase output latency (the time between when an input stream into a buffer is received and when the buffer reaches an appropriate level of occupancy to initiate an output stream from that buffer).

BRIEF DESCRIPTION OF THE DRAWINGS

Various techniques will be described with reference to the drawings, in which.

DETAILED DESCRIPTION

Figure 1:
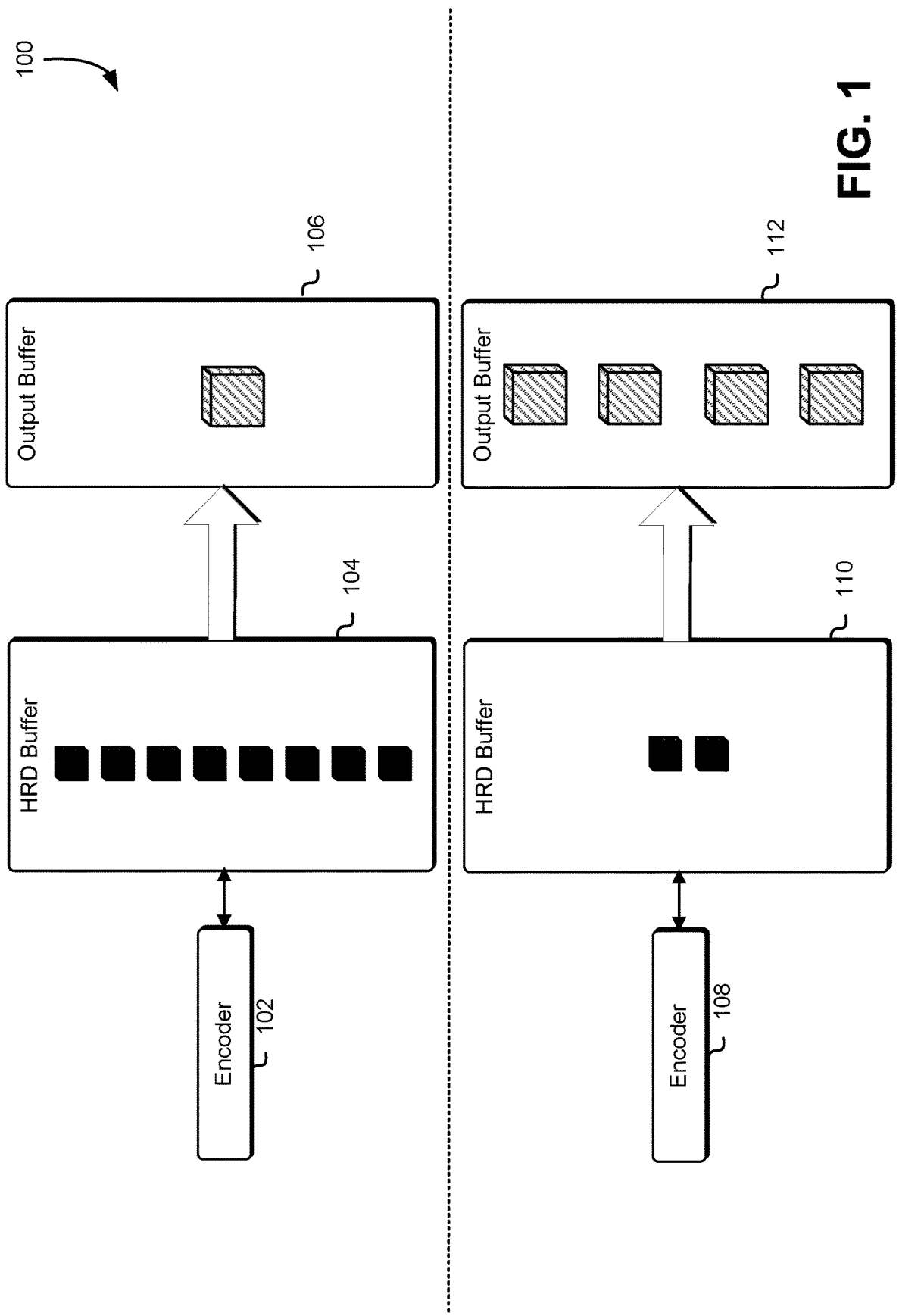
FIG. 1 illustrates an example implementation where an encoder using a hypothetical reference decoder (HRD) buffer influences the occupancy of an output buffer for the encoded, encapsulated packets, in accordance with some embodiments.

In one example, a video encoder, such as an encoder compliant with H.264 or VC-1, uses a hypothetical reference decoder (HRD) buffer model or video buffering verifier (VBV) model to verify that the output stream complies with certain parameters associated with decoding of the output stream, and, in some cases, places quality and compression constraints on encoding/processing of the (generally) highly variable data payload sizes of input streams over time (e.g., as a result of certain picture frames being more complex and/or less compressible than others, or also as a result of different frames being encoded with different picture types such as I, P, B frames that use varying degrees of temporal prediction). The functionality of the encoder and the usage of an HRD buffer allow for, in some cases, population of the HRD buffer with a greater amount of data (e.g., bits) when a "small" (highly compressible) picture is being encoded, and "borrowing" the data from the HRD buffer when a large or complex (relatively incompressible) picture is being encoded.

Accordingly, in this example, occupancy/residency data regarding the HRD buffer may be recorded or otherwise transmitted to a downstream component responsible for output buffering in the encoding system, and used by that downstream component to determine a minimum time-based buffer occupancy at which packets can begin being transmitted from that output buffer at a constant bit rate (CBR) without risk of underflowing or overflowing that output buffer over time (as the HRD buffer occupancy changes).

For example, for a given first UDP packet (encapsulating, e.g., transport stream packets), an output thread or other entity uses the current encoder HRD buffer occupancy, relative to the maximum configured HRD buffer occupancy, to calculate a relative target duration (with respect to time, e.g., of the picture data held therein) for that packet in the output buffer before that first UDP packet is released from the output buffer. If the current HRD buffer occupancy is small or zero, then to prevent future UDP output buffer underflow the UDP output thread must buffer proportionally more packets before sending that first packet, since over time the encoder may reserve more bits in its HRD buffer which will result in fewer bits being scheduled into the output buffer. Conversely, if the current HRD buffer occupancy is large or near maximum, then to prevent future UDP output buffer overflow and minimize latency, the UDP output thread must buffer proportionally fewer packets before sending that first packet, since over time the encoder may reduce the number of bits reserved in its HRD buffer which will result in more bits being scheduled into the output buffer. As may be contemplated, both the target duration, as well as the absolute size (in bits or bytes, for example), may vary on a per-packet basis, a per-picture basis, a per-(arbitrarily defined)-segment basis, or some other periodic basis.

As another example, an output thread may make decisions regarding when to begin sending the buffered packets based on the current aggregate duration (with respect to time) represented by the packets in the output buffer in addition to knowledge of the difference between the maximum HRD duration and the current HRD duration (where HRD duration is a time representation of the HRD occupancy which can be calculated given knowledge of the encoder bitrate). The system can begin sending packets when CurrentOutputBufferDuration>=TargetDuration+ (MaxHRDDuration−CurrentHRDDuration), where:

CurrentOutputBufferDuration is the current aggregate duration (with respect to time) represented by the packets in the output buffer. The program clock reference of the last submitted packet in sequence in the buffer minus the program clock reference of the first submitted packet in the buffer provides the actual duration represented by the packets held in the output buffer at a given time;

TargetDuration is the minimum target duration (with respect to time) that we want to maintain in the output buffer at all times. For low latency applications if could be set to zero, but it may be useful to set it to higher values (e.g., one second) to provide some protection against underflow in case of momentary delays in the arrival of data from the encoder;

MaxHRDDuration is the maximum HRD buffer occupancy expressed with respect to time (which for a CBR video elementary stream could be calculated by dividing the maximum HRD buffer size expressed in bits by the CBR bitrate); and CurrentHRDDuration is the current HRD buffer occupancy expressed with respect to time (which for a CBR video elementary stream could be calculated by dividing the maximum HRD buffer size expressed in bits by the CBR bitrate).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example implementation 100 where an encoder using a hypothetical reference decoder (HRD) buffer influences the occupancy of an output buffer for the encoded, encapsulated packets, in accordance with some embodiments.

The upper half of FIG. 1 schematically illustrates the basic effect of an example implementation when the HRD buffer 104 is highly populated. A video encoder 102, such as an encoder compliant with H.264, VC-1, or other video compression standard, uses a hypothetical reference decoder (HRD) buffer model or video buffering verifier (VBV) model to verify that the output stream complies with certain parameters associated with decoding of the output stream, and, in some cases, places quality and compression constraints on encoding/processing of the (generally) highly variable data payload sizes of input streams over time (e.g., as a result of certain picture frames being more complex and/or less compressible than others, or also as a result of different frames being encoded with different picture types, such as I frames, P frames, and B frames, which use varying degrees of temporal prediction).

The functionality of the encoder 102 and the usage of an HRD buffer 104 is to, in some cases, populate the HRD buffer with a greater amount of data (e.g., bits) when a "small" (highly compressible) picture is being encoded, and "borrow" the data from the HRD buffer 104 when a large or complex (relatively incompressible) picture is being encoded.

To facilitate this, occupancy/residency data regarding the HRD buffer may be recorded or otherwise transmitted, e.g., directly from the HRD buffer or by a different component monitoring the HRD buffer, to a downstream component responsible for output buffering in the encoding system, and used by that downstream component to inform the decision regarding the occupancy of data needed in the UDP output buffer before the first packet should be transmitted from the UDP output buffer.

As mentioned, the upper half of FIG. 1 reflects a state where the HRD buffer 104 is highly populated at a given point in time. As a result, an implementation inversely correlating the HRD buffer 104 occupancy with the duration of data needed before sending the first UDP packet would calculate a relatively smaller duration of packets needed before sending the first UDP packet out of output buffer 106.

The lower half of FIG. 1 schematically illustrates an alternate scenario. As the encoder 108 handles picture data with high complexity, or is otherwise relatively incompressible, the encoder 108 may use data contained in the HRD buffer 110 (e.g., borrow bits therefrom) and thus, the HRD buffer occupancy is relatively low. This occupancy data may be used, e.g., by an output thread, to calculate a relatively longer duration of packets needed before sending the first UDP packet out of the output buffer 112.

For example, for a given first UDP packet (encapsulating, e.g., transport stream packets), an output thread or other entity uses the current encoder HRD buffer occupancy, relative to the maximum configured HRD buffer occupancy, to calculate a relative target duration (with respect to time, e.g., of the picture data held therein) for that packet in the output buffer before that first UDP packet is released from the output buffer. If the current HRD buffer occupancy is small or zero, then to prevent future UDP output buffer underflow the UDP output thread must buffer proportionally more packets before sending that first packet, since over time the encoder may reserve more bits in its HRD buffer, which will result in fewer bits being scheduled into the output buffer. Conversely, if the current HRD buffer occupancy is large or near maximum, then to prevent future UDP output buffer overflow and minimize latency the UDP output thread must buffer proportionally fewer packets before sending that first packet, since over time the encoder may reduce the number of bits reserved in its HRD buffer, which in turn will result in more bits being scheduled into the output buffer. As may be contemplated, both the target duration, as well as the absolute size (in bits or bytes, for example), may vary on a per-packet basis, a per-picture basis, a per-(arbitrarily defined)-segment basis, or some other periodic basis.

In some embodiments, the target duration, with respect to time, of the first packet contained within the output buffer prior to being sent or otherwise evicted from the output buffer is calculated as a function of the maximum HRD buffer occupancy minus the current HRD buffer occupancy (e.g., for that packet). In some of such embodiments, a minimum safety margin is added to this calculated duration so as to account for system latency, network conditions, encoding errors, upstream or downstream interruptions, and the like. As may be contemplated, the size of the output buffer is directly (not inversely) proportional to this calculated target duration, but at the same time is inversely correlated to the actual current HRD buffer occupancy alone. The outcome of this calculation reflects the amount of buffer space in bits or bytes necessary to accommodate the resultant encoded frame (or frames, or packets reflecting such frame(s)), even though, in some cases, the output stream of encapsulated packets leaves the output buffer at a constant bit rate.

In some embodiments, if the current HRD occupancy of a given packet or set of packets cannot be determined or is otherwise unknown, it may be estimated from the transport stream (e.g., the transport stream multiplexer output) by examining the program clock reference (PCR) of the first transport stream packet of the video frame and comparing it to the DTS (decode timestamp) of that video frame. The difference between the two values is generally proportional to the HRD buffer occupancy of the encoder at the time it encoded the video frame, and, accordingly, it may be used to infer the HRD occupancy for the frame.

Generally, depending on the implementation, the system of the present disclosure may be impartial as to the type (e.g., video, audio, etc.) of input data being encoded, packetized, etc. For example, a media stream could be interleaved with both audio and video data, but the system of the present disclosure may process blocks of video data in parallel with and independent from blocks of audio data being processed from the same stream. It should be noted, that the system of the present disclosure can involve multiple input data streams in parallel (e.g., a video stream and one or more audio streams being accessed and processed separately) and/or can involve separate portions of a same stream in parallel (e.g., streaming or receiving, in blocks, a video content from a video source and downloading a number of read-ahead blocks of video from the same video source in parallel). The streams, sources, or other data accessed by embodiments of the present disclosure need not be stored or encoded in any particular format; for example, the system of the present disclosure supports Moving Picture Experts Group (MPEG) transport stream format (MPEG-TS), MPEG-4 (MP4) format, Hypertext Transfer Protocol (HTTP) live streaming format, and so on.

Video data may be compressed according to any of a variety of encoding formats or standards. In some examples, an "encoding format" or "encoding standard" may be a format or standard in which the video or audio elementary streams are written and compressed, such as MPEG-2, H.264, High Efficiency Video Coding (HEVC), VC-1, or Apple ProRes. Similarly, audio data may be uncompressed or compressed (e.g., using Advanced Audio Coding (AAC) or Dolby Digital formats). Note that a multiplexing or "packaging format" may refer to multiplexed file format that contains those elementary streams, such as an MP4 wrapper or transport stream wrapper. A demultiplexer may be implemented to demultiplex that outer packaging format to obtain the elementary streams. The decoder then decodes the elementary streams themselves. In the present disclosure, the term "encoding format" may also refer to packaging formats. So once data has been obtained and demultiplexed, it may be further transcoded into an uncompressed format and/or re-encoded per a requesting user's specification. In some embodiments, uncompressed output may be then displayed on a screen of a user device. So, for example an MPEG-2 video may be downloaded and transcoded/re-encoded into H.264 format. As another example, an H.264 video may be downloaded and transcoded/re-encoded into H.264 but at a different bit rate (e.g., the video may have been scaled, etc.).

Note that the embodiments of the present disclosure should not be so narrowly construed as to exclude uses of processing types of data beyond video and audio data. For example, the system of the present disclosure may be utilized to process large data sets having data that is typically accessed in a sequential order; e.g., any algorithm for processing data sequentially (e.g., data that is being received live/real-time) can be utilized in implementations of embodiments of the present disclosure. Likewise, the system may be utilized to process data associated with other access patterns. As an example, the system may be advantageous for processing input data that are accessed "backwards" or "forwards" at speeds faster or slower than real time.

Figure 2:
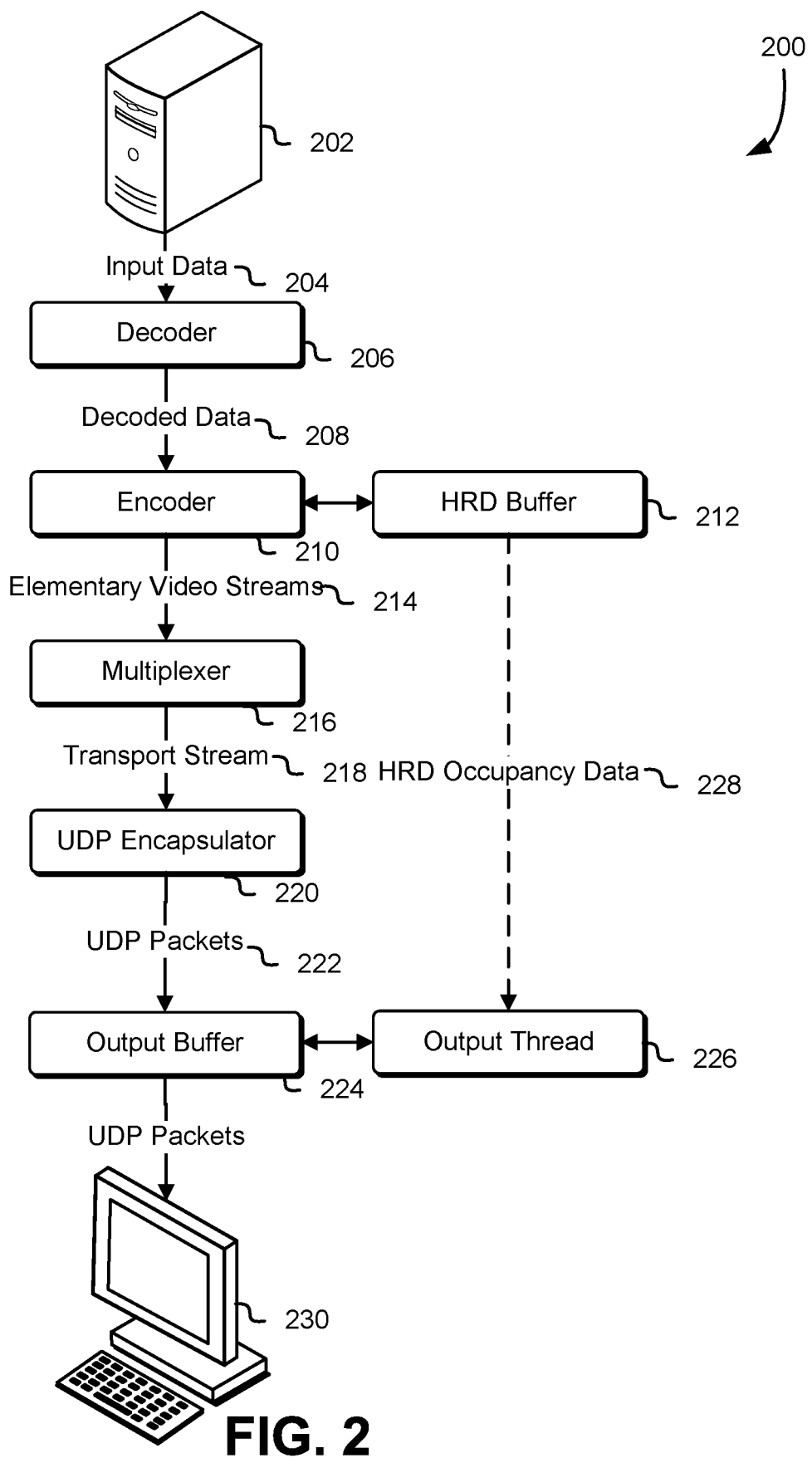
FIG. 2 illustrates an example environment in which an output buffer and output thread are configured using HRD buffer occupancy data in a fashion sensitive to changes in the transport stream over time, in accordance with some embodiments.

FIG. 2 illustrates an example environment 200 in which an output buffer and output thread are configured using HRD buffer occupancy data in a fashion sensitive to changes in the transport stream over time, in accordance with some embodiments.

The techniques described in connection with FIG. 1 may be implemented in an end-to-end encoding/transcoding system, such as the one described, by way of example, in connection with this FIG. 2. For example, a system or other data source 202 provides input data 204 to a decoder 206. The data source 202 may be any system capable of generating or providing encoded data, such as audiovisual data, and can include cameras, smartphones, video distribution systems, computer systems, and the like. The input data 204 may be any data encoded in a format recognized by the decoder 206, which may either be a set of executable instructions implemented by a computing resource, such as that of a computing resource service provider, or a hardware device that decodes encoded data according to one or more standards as previously described.

The decoder 206 decodes the input data 204 and produces intermediary decoded data 208, which are then encoded 210 into one or more formats as one or more elementary video streams 214, also as described above. In some cases, the elementary streams 214 output from the encoder 210 may include one or more different encoding formats than that used to encode the input data 204 in the first instance. In other cases, the encoder 210 may encode the incoming decoded data 208 into elementary video streams 214 having the same encoding format, but using different parameters. These elementary video streams 214 are multiplexed by a multiplexer 216 into a transport stream 218, such as an MPEG-TS transport stream, which comprises transport stream packets. As with the encoder 210 and decoder 206, the multiplexer 216 (as well as the HRD buffer 212, UDP encapsulator 220, output buffer 224, output thread 226, and other components shown in FIG. 2), may be implemented as hardware, instructions executable on such hardware, or some combination thereof.

In some embodiments, the encoder 210 is configured, as previously mentioned, to use an HRD buffer 212. Depending on the encoder 210, such a buffer may be a VBV buffer, or other buffer configured to provide similar functionality (e.g., to verify the bufferability and decodability of a resultant output stream, within a given set of constraints, and similarly provide feedback to the encoder regarding any adjustments to the encoder's functionality necessary to keep the HRD or similar buffer from underflowing or overflowing). As previously mentioned, the HRD buffer 212 reserves data (e.g., measured in bits) so as to accommodate "peakiness" in compressibility/complexity of incoming decoded data 208 and, accordingly, the "peakiness" (in time of decode and/or of size in bits or bytes) of the output data in the transport stream 214. As such, the maximum size, as well as the occupancy range, of the HRD buffer 212 is related to the encoding parameters set for the encoder, which can include output type (e.g., constant versus variable bit rate output), encoding quality, bitrate range, and the like.

As mentioned, one or more elementary video streams 214 from one or more encoders 210 (and, accordingly, from one or more sources 202 having one or more input data streams 204) are then multiplexed by the multiplexer 216. The multiplexer 216 may be implemented as a hardware device or, in some embodiments, as a set of executable instructions executed by one or more processors of a hardware device. The transport stream may be sent to a UDP encapsulator 220, which encapsulates packets of the incoming transport stream 214 in other types of packets, such as network packets (e.g., UDP packets or RTP packets), that are negotiable over a network and thus receivable and readable by an eventual endpoint device 230, such as an electronic device on which a user receives the data.

As mentioned elsewhere herein, the UDP encapsulator 220 may encapsulate MPEG-TS packets in UDP packets 222. In such embodiments, by the nature of UDP, the stream of UDP packets carry no inherent guarantee of ordering or successful delivery, and thus, in order for a receiving device 230 to properly receive a stream without issues related to dropped packets, jitter, etc., an output buffer 224 is utilized and configured by an output thread 226 to ensure a consistent and reliable flow of output UDP packets 222 to the user device 230. However, as mentioned, the "peakiness" of delivery of the UDP packets by the UDP encapsulator 220 is proportional and directly correlated with the "peakiness" of delivery of the incoming transport stream 214 packets, which in turn is dependent on the complexity swings of the incoming decoded data 208 as well as the configuration of the encoder 210 (e.g., which may produce elementary video streams 214 in a similarly "peaky" fashion, at least with respect to size and/or relative duration).

Such "peakiness" can result in underflow or overflow of the output buffer 224 if the configuration of the output buffer is not carefully controlled. For example, the output buffer 224 may drain at a consistent rate, in the case of a constant bitrate output stream, but UDP packets 222 may not be delivered (or may be too suddenly delivered) to the output buffer 224 to support the output rate. As another example, in a variable bitrate (VBR) transport stream regime, the output rate from the output buffer 224 may be loosely (or tightly, or not at all) correlated with the rate at which UDP packets 222 are submitted to the output buffer 224.

Figure 3:
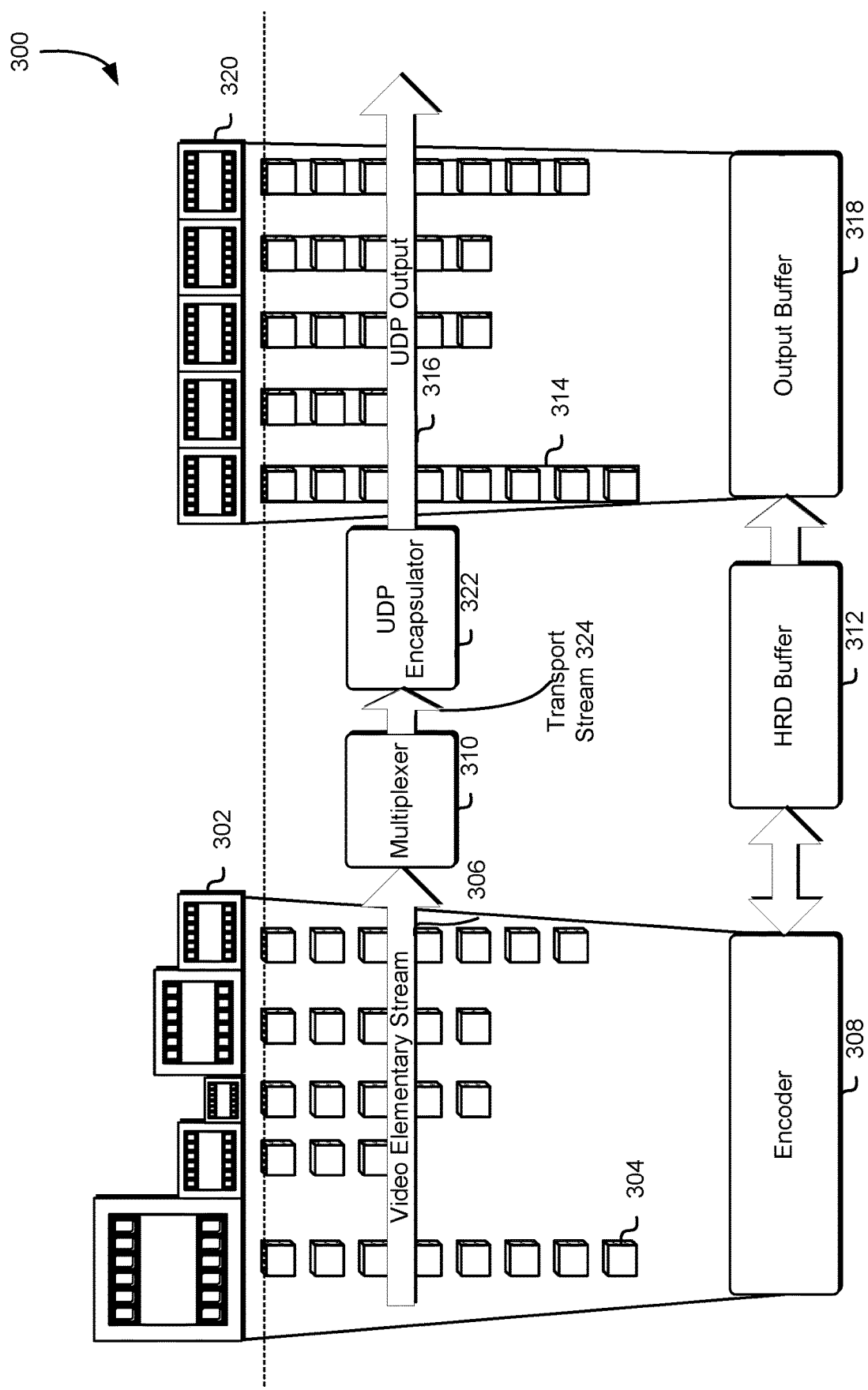
FIG. 3 illustrates an example implementation where an encoder encoding a heterogeneous input stream (e.g., delivering pictures of variable size) influences, via related information associated with its HRD buffer, the size of the output buffer over time, in accordance with some embodiments.

To ameliorate the effect of this input "peakiness," the HRD buffer 212 may submit, either directly or through an auxiliary resource, such as a hardware or software monitor associated with the HRD buffer 212, or by way of calculation by the multiplexer 216 using techniques described elsewhere herein, occupancy data 228 to an output thread 226, so as to initialize or otherwise configure the output buffer 224 according to the techniques described herein, such as in connection with at least FIGS. 1 and 3.

For example, the occupancy and sizing of the output buffer may be calculated in terms of time duration of the transport stream packets contained therein, rather than being controlled by size (in terms of bits/bytes). Such duration may be calculated or imputed from program clock reference data embedded within the packets of the transport stream 214 encapsulated within the UDP packets 218 (which, in some cases, are aligned in a specific way so as to coincide). Additionally, as previously mentioned, the HRD occupancy data 228 for a given frame or set of frames can be construed as correlated with the duration of transport stream packets that need to be buffered in the output buffer 220 to prevent future underflow or overflow.

Accordingly, the output buffer 220 may be sized or otherwise configured by the output thread 226 so as to account for the input "peakiness" while not over- or under-allocating the output buffer 220. This sizing is determined before packets begin arriving into the output buffer, and is determined in proportion to the maximum expected delay (which in turn is proportional to the maximum HRD buffer delay).

FIG. 3 illustrates an example implementation 300 where an encoder encoding a series of incoming uncompressed frames and delivering encoded video pictures of variable size, influences, via related information associated with its HRD buffer, the occupancy of the output buffer over time, in accordance with some embodiments.

In the illustrated example, the data 304 of the video elementary stream 306 represent images/frames 302 of varying complexity and thus sizes, even though each given frame represents the same absolute duration (e.g., 320) relative to a program clock reference. Such encoded video elementary stream bytes 304 of the video elementary stream 306 are generated by the encoder 308 and delivered to the multiplexer 310 to generate a transport stream 324, packets of which are encapsulated by a UDP encapsulator 322 into UDP packets 314 of UDP output 316. The UDP packets 314 comprise transport stream packets 324 encapsulated in UDP packets 314. In some embodiments, the multiplexer 310 and UDP encapsulator 322 "greedily" encapsulates incoming data on an, e.g., best effort basis, leaving buffering to a downstream component, which causes the input peakiness to be passed on to the output buffer 318 (which then is responsible, via the output thread described elsewhere herein, for not passing such peakiness of delivery to the endpoint or other consumer of the output).

As previously mentioned, the encoder 308 may use an HRD buffer 312 to allow the encoder to adjust for differences in frame complexity and/or encoder picture type within a given set of constraints. As previously mentioned, the occupancy and/or initial sizing of the output buffer 318 may be calculated in terms of time duration of the frames contained therein, rather than being controlled by size (in terms of bits/bytes). Such duration may be calculated or imputed from program clock reference data embedded within the packets of the transport stream 324 encapsulated within the UDP packets 316 (which, in some cases, are aligned in a specific way so as to coincide, as denoted by the horizontal dashed line in FIG. 3). For example, the program time of a given packet that does not carry PCR data can be determined by finding the sequentially previous packet that does carry PCR data and the sequentially next packet that does carry PCR data, and linearly interpolating between the two. In such a case, the degree of interpolation is directly proportional to the number of bytes between the sequentially previous PCR-bearing packet and the current, non-PCR bearing packet, when compared to the number of bytes between the current, non-PCR bearing packet and the sequentially next PCR-bearing packet.

The output buffer 318 may be populated to an initial occupancy prior to release of packets from the output buffer 318 by the output thread so as to account for the input "peakiness" so as to not over- or underflow the output buffer 318. To facilitate this, occupancy/residency data regarding the HRD buffer 312 may be recorded, transmitted, and/or calculated e.g., directly from the HRD buffer 312, by a different component monitoring the HRD buffer 312, or by implication by a component in the chain, such as the multiplexer 310 or the UDP encapsulator 322, to the output buffer 318, whether at initialization of the buffer, in connection with a specific duration of picture data contained with the buffer, and/or dynamically over time as the nature of the encoded data changes.

For example, for a given first UDP packet 316 (encapsulating, e.g., transport stream packets 324), an output thread or other entity uses the current encoder HRD buffer 312 occupancy relative to the frame represented by that first UDP packet 314, and the maximum configured HRD buffer occupancy, to calculate a relative target duration (with respect to time, e.g., of the picture data held therein) for that packet in the output buffer 318 before that first UDP packet is released from the output buffer 318. If the current HRD buffer occupancy is small or zero, then to prevent future UDP output buffer underflow, the UDP output thread must buffer proportionally more packets before sending that first packet since over time the encoder may reserve more bits in its HRD buffer, which will result in fewer bits being scheduled into the output buffer. Conversely, if the current HRD buffer 318 occupancy is large or near maximum, then to prevent future UDP output buffer overflow and minimize latency, the UDP output thread must buffer proportionally fewer packets before sending that first packet since over time the encoder may reduce the number of bits reserved in its HRD buffer which will result in more bits being scheduled into the output buffer. As may be contemplated, both the target duration, as well as the absolute size (in bits or bytes, for example), may vary on a per-packet basis, a per-picture basis, a per-(arbitrarily defined)-segment basis, or some other periodic basis.

In some embodiments, the target duration, with respect to time, of the first packets contained within the output buffer prior to being sent or otherwise evicted from the output buffer is calculated as a function of the maximum HRD buffer occupancy minus the current HRD buffer occupancy (e.g., for the first packet among the buffered packets). In some of such embodiments, a minimum safety margin is added to this calculated duration so as to account for system latency, network conditions, encoding errors, upstream or downstream interruptions, and the like. As may be contemplated, the size of the output buffer is directly (not inversely) proportional to this calculated target duration, but at the same time is inversely correlated to the actual current HRD buffer occupancy alone. The outcome of this calculation reflects the amount of buffer space in bits or bytes necessary to accommodate the resultant encoded frame (or frames, or packets reflecting such frame(s)), even though, in some cases, the output stream of encapsulated packets leaves the output buffer at a constant bit rate.

In some embodiments, if the current HRD occupancy of a given packet or set of packets cannot be directly determined or is otherwise unknown, it may be estimated from the transport stream (e.g., the encoder output) by examining the program clock reference (PCR) of the first transport stream packet of the video frame and comparing it to the DTS (decode timestamp) of that video frame. The difference between the two values is generally equal to or nearly equal to the current HRD buffer occupancy (with respect to time) and accordingly can be used to calculate the amount of data that needs to be buffered in the output buffer 318 before beginning to send packets, as described elsewhere.

Another aspect which may be implemented to, e.g., reduce latency of the system with respect to the timing of the input stream and when it is received by an endpoint or user device, as well as to accommodate variable bitrate transport streams (e.g., those which may not be evicted from the output buffer 406 at a constant rate, as would be the case for a constant bitrate transport stream), is described in connection with FIG. 4.

Figure 4:
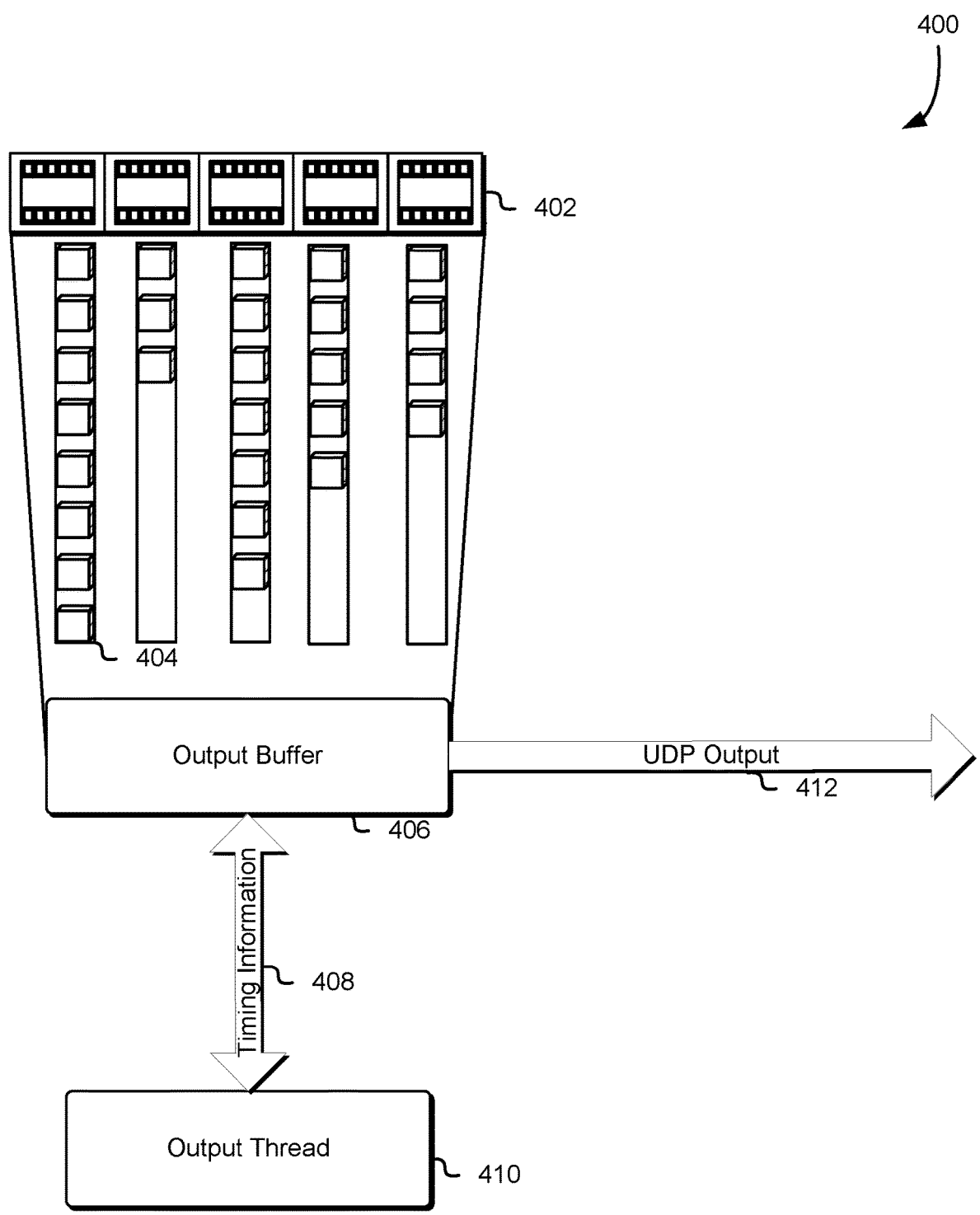
FIG. 4 illustrates an example implementation where an output buffer begins transmitting or otherwise releasing buffered packets based at least in part on a time duration of the picture data contained within the buffered packets and knowledge of the encoder's current HRD buffer occupancy, in accordance with some embodiments.

FIG. 4 illustrates an example implementation 400 where an output buffer begins transmitting or otherwise releasing buffered packets based on a time duration of the picture data contained within the buffered packets, in accordance with some embodiments.

An output thread 410 may make decisions regarding when to begin sending the buffered packets 404, e.g., UDP packets encapsulating transport stream packets, based on the aggregate duration (with respect to time) of the image data 402 represented by the packets in the output buffer. As previously mentioned, in some cases, the program clock reference data associated with at least some of the transport stream packets is determined or calculated (e.g., linearly interpolated) such that the UDP output 412 is generally coordinated with respect to the PCRs, thereby allowing for precision in submission of such packets (and thus reducing jitter problems at the receiving end).

As such timing data 408 is easily available in the output buffer 406, and in some cases, from the encoder, an implementing system may use such information to determine when and whether to begin the flow of encapsulated packets 404 out of the output buffer 406 to the eventual destination, based on a duration of time represented by the buffered packets 404, rather than some other trigger (e.g., occupancy level in bits/bytes of the output buffer 406). Initiating the flow of packets predicated on time-based occupancy rather than on byte-based occupancy is advantageous, since it allows accurate control of the output latency regardless of whether the payload is a constant bitrate stream or a variable bitrate stream (in the case of a VBR stream, it may not be possible to determine the time duration of a given set of packets from an observation of the size of those packets in bytes).

The timing information 408 is used, in some embodiments, to calculate the actual duration represented within the output buffer, and when that occupancy reaches a certain threshold (in some cases plus an additional safety margin), the UDP output 412 begins. In some embodiments, the program clock reference of (or imputed to) the last submitted packet in sequence in the output buffer 406 minus the program clock reference of the first submitted packet in the output buffer 406 provides the actual duration represented by the packets held in the output buffer 406 at a given time.

When that duration is reached as an increasing number of packets are being queued in the buffer, the packets are then released out of the buffer in sequence as the UDP output 412, and at the rate prescribed by the transport stream of which they are part (which, as previously mentioned, may be either variable or constant). The use of time duration, rather than absolute occupancy, allows the output buffer to be appropriately sized without incurring the risk of underflow or overflow, especially in cases where the output stream is of a variable bitrate.

Figure 5:
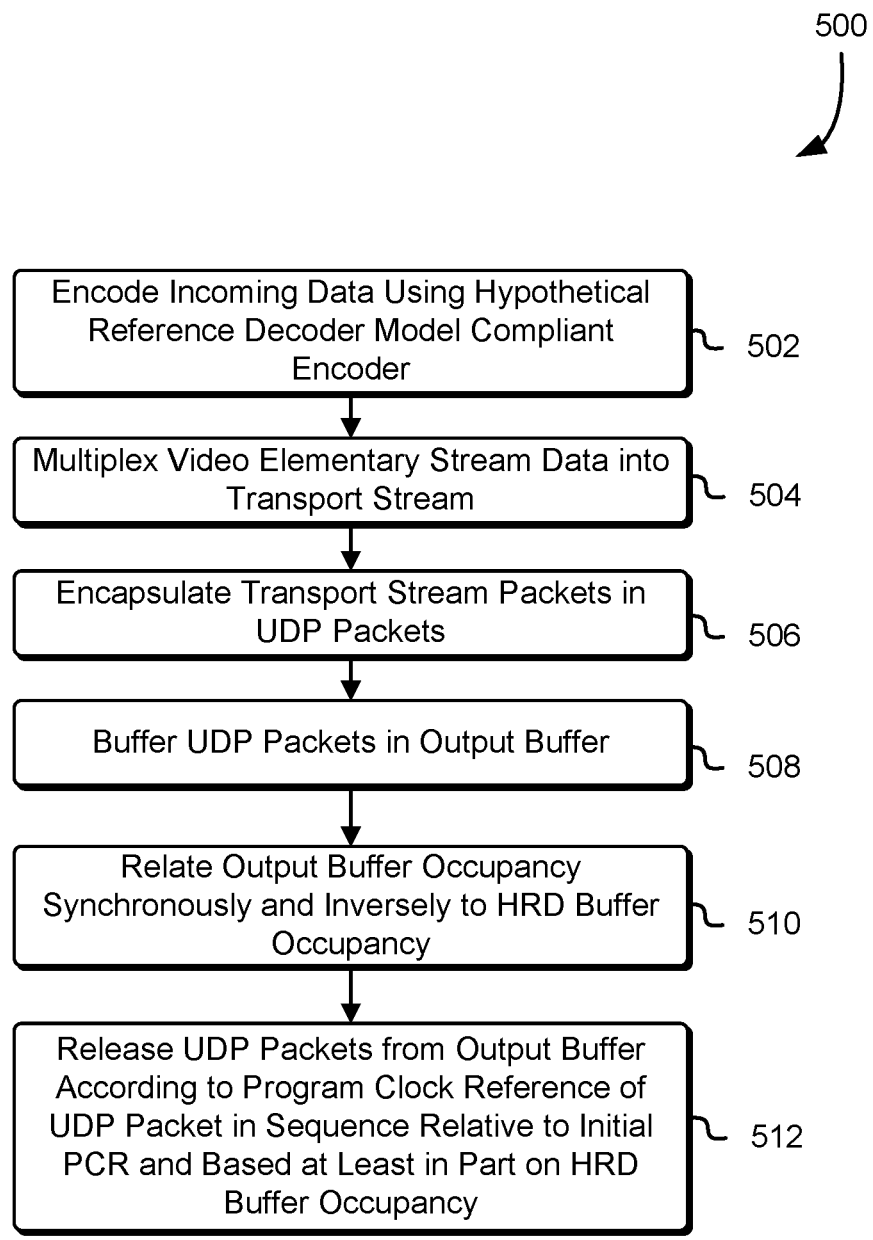
FIG. 5 illustrates an example process for encoding, buffering, and releasing data in accordance with some embodiments.

FIG. 5 illustrates an example process 500 for encoding, buffering, and releasing data in accordance with some embodiments.

At step 502, incoming data, which in some cases may be decoded data or unencoded data sourced from multiple streams, is encoded (or re-encoded) using, e.g., an encoder as previously described in connection with at least FIGS. 1-3 that implements a hypothetical reference decoder buffer model or similar verifying buffer component. As previously mentioned, the functionality of the encoder and the usage of an HRD buffer is to, in some cases, populate the HRD buffer with a greater amount of data (e.g., bits) when a "small" (highly compressible) picture is being encoded, and "borrow" the data from the HRD buffer when a large or complex (relatively incompressible) picture is being encoded.

At step 504, the video elementary stream generated by the encoder in step 502 are multiplexed, e.g., by a multiplexer, and at step 506, the transport stream packets are encapsulated by, e.g., a UDP encapsulator, in a different type of packet, such as a UDP packet, for eventual delivery to an endpoint.

At step 508, the resultant UDP packets generated in step 506 are submitted to an output buffer, which in some embodiments is associated with an output thread that generates data regarding the contents and occupancy of the output buffer, and, in some cases, controls the influx and/or outflow of data from the output buffer. The output thread may be a hardware component, or a set of instructions implemented by one or more processors to perform the actions described herein. While UDP packets are described by way of example, other protocols may be used to similar effect.

At step 510, the output thread or other entity associates the initial output buffer occupancy with respect to packet duration synchronously, and inversely, relative to the HRD buffer occupancy imputed to the initial packet received by the initial output buffer. As previously mentioned in connection with at least FIGS. 1-3, the occupancy of the output buffer may be calculated in terms of time duration of the packets contained therein, rather than being controlled by size (in terms of bits/bytes). Such duration may be calculated or imputed from program clock reference data embedded within the packets of the transport stream encapsulated within the UDP packets (which, in some cases, are aligned in a specific way so as to coincide).

At step 512, an implementing system may use such timing information (e.g., packet duration) to determine when and whether to begin the flow of encapsulated packets out of the output buffer to the eventual destination, based on a duration of time represented by the buffered packets, rather than some other trigger (e.g., occupancy level in bits/bytes of the output buffer). As previously mentioned, the timing information is used, in some embodiments, to calculate the actual duration represented within the output buffer, and when that occupancy reaches a certain threshold (in some cases plus an additional safety margin), the UDP output begins. The threshold may, as previously mentioned, be calculated based at least in part on current and maximum HRD buffer occupancy information. In some embodiments, the program clock reference of (or imputed to) the last submitted packet in sequence in the output buffer minus the program clock reference of the first submitted packet in the output buffer provides the actual duration represented by the packets held in the output buffer at a given time.

When that duration is reached as an increasing number of packets are being queued in the buffer, the packets are then released out of the buffer in sequence as the UDP output, and at the rate prescribed by the transport stream of which they are part (which, as previously mentioned, may be either variable or constant). The use of time duration, rather than absolute occupancy, allows the output buffer to be appropriately sized without incurring the risk of underflow or overflow, especially in cases where the output stream is of a variable bitrate.

Figure 6:
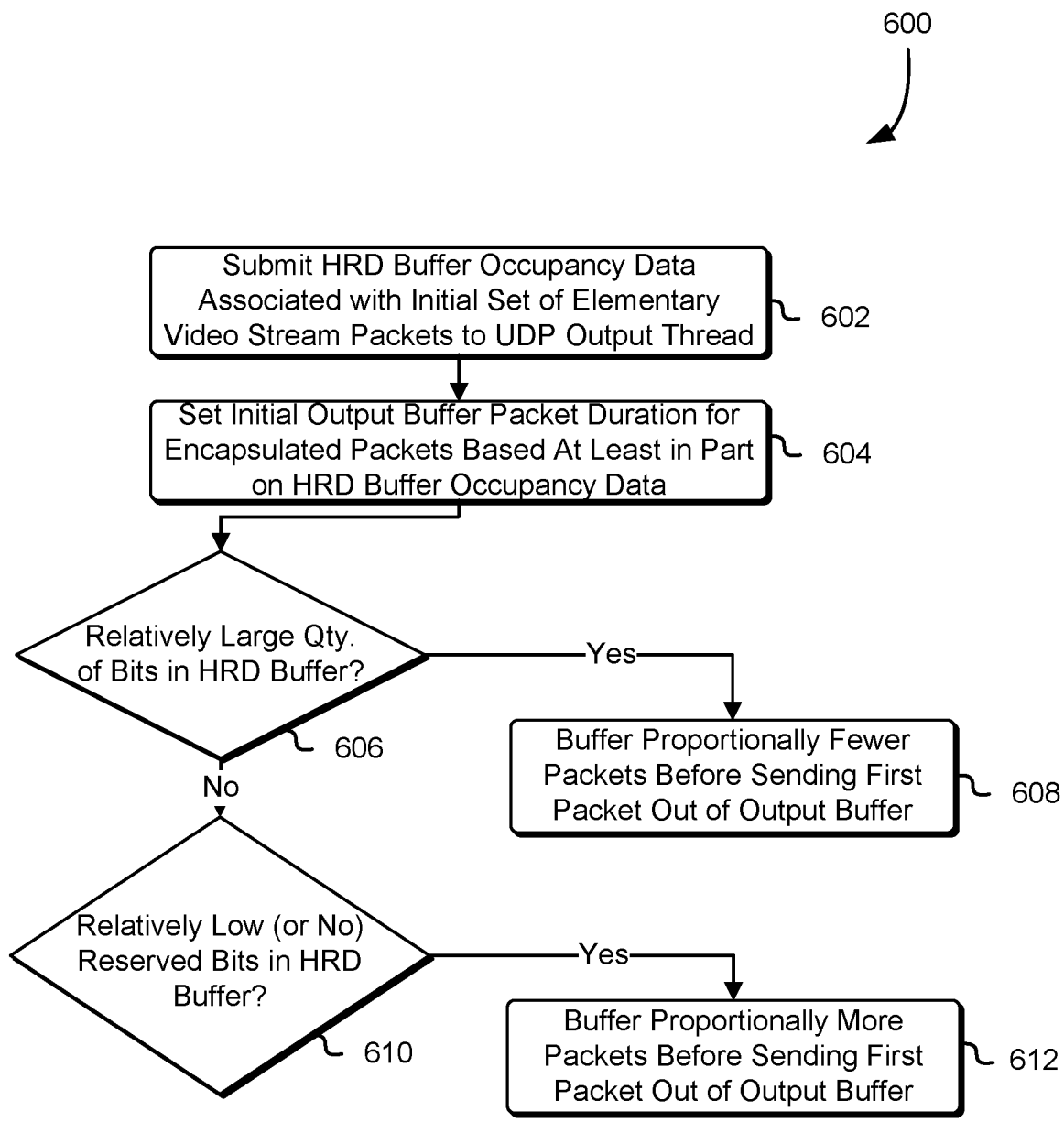
FIG. 6 illustrates an example process for configuring an output buffer according to HRD buffer occupancy data associated with an encoder, in accordance with some embodiments.

FIG. 6 illustrates an example process 600 for initial occupation of an output buffer according to HRD buffer occupancy data associated with an encoder, in accordance with some embodiments.

At step 602, HRD buffer occupancy data associated with a given set of transport stream packets is sent, such as by an HRD buffer or a monitor associated therewith, to an output thread, such as a UDP output thread. As previously mentioned, such occupancy data may also be sent by the encoder, or, in some cases, may be imputed from the transport stream (e.g., the encoder output) by examining the program clock reference (PCR) of the first transport stream packet of the video frame and comparing it to the DTS (decode timestamp) of that video frame. The difference between the two values is generally equal or nearly equal to the current HRD buffer occupancy (with respect to time), and accordingly can be used to calculate the amount of data to be buffered in the output buffer before initiating packet output, as described elsewhere.

At step 604, the HRD occupancy data submitted in step 602 is used to calculate and set the target duration (and/or represented time duration) for the encapsulated packets therein prior to sending the initial packet. For example, the target duration, with respect to time, of the first packet contained within the output buffer prior to being sent or otherwise evicted from the output buffer is calculated as a function of the maximum HRD buffer occupancy minus the current HRD buffer occupancy (e.g., for that packet). In some of such embodiments, a minimum safety margin is added to this calculated duration so as to account for system latency, network conditions, encoding errors, upstream or downstream interruptions, and the like. As may be contemplated, the occupancy of the output buffer is directly (not inversely) proportional to this calculated target duration, but at the same time is inversely correlated to the actual current HRD buffer occupancy alone. The outcome of this calculation reflects the number of packets necessary to represent the target duration.

Using this calculation, at decision point 606, if there are a large number of bits (or an excess of such bits) in the HRD buffer, the output buffer buffers proportionally fewer packets before sending the associated packets at step 608. Conversely, at decision point 610, if there are relatively few (or no) reserved bits in the HRD buffer, the output buffer buffers proportionally more packets before sending the first packet out of the output buffer at step 612. This calculation may be made at initiation, continuously thereafter, periodically, on receipt of a packet by the output buffer, by some other trigger, or some combination thereof.

Figure 7:
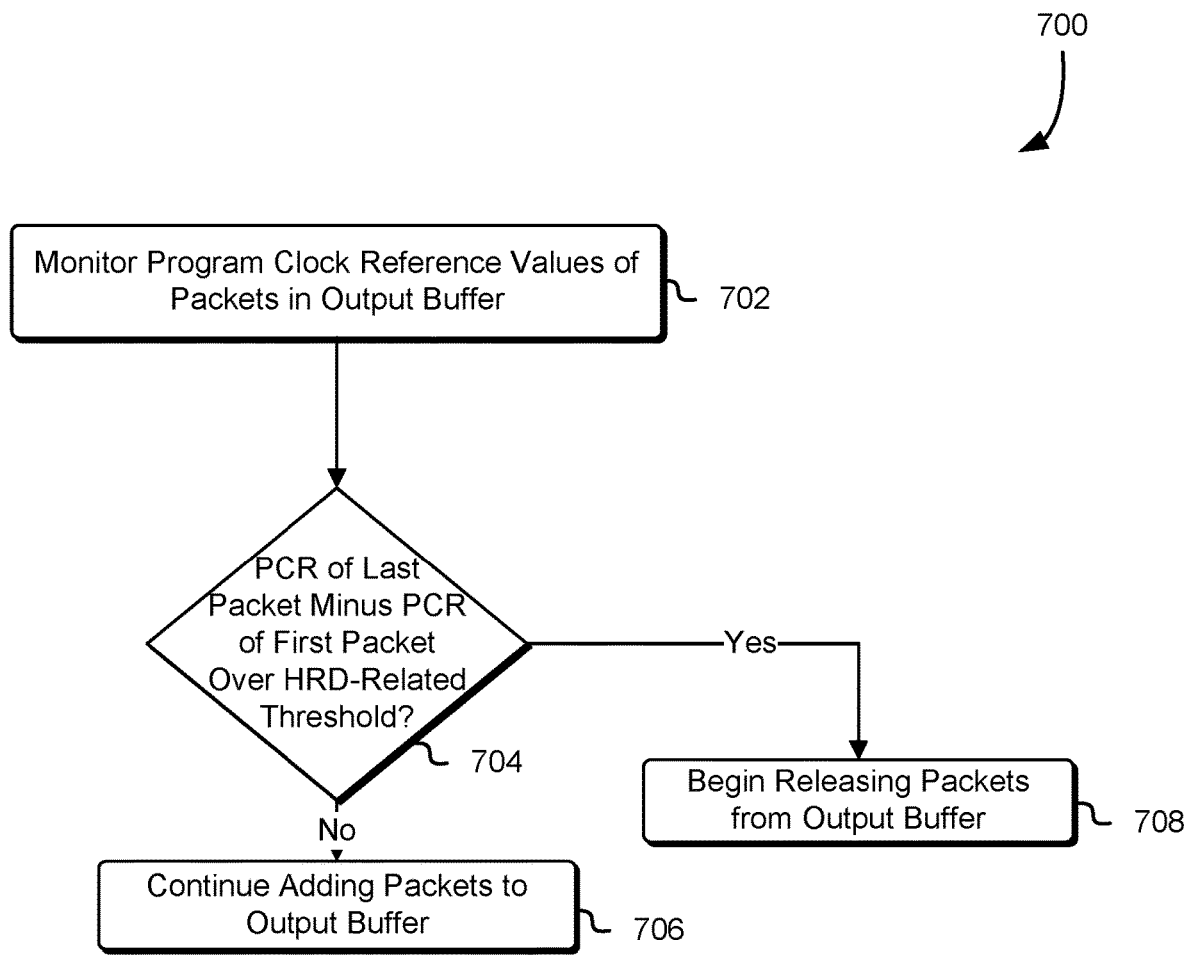
FIG. 7 illustrates an example process for releasing buffered data packets based on duration of the picture data contained within, in accordance with some embodiments.

FIG. 7 illustrates an example process 700 for releasing buffered data packets based on duration of the picture data contained within, in accordance with some embodiments.

At step 702, the relative duration of packets represented in the output buffer is monitored, e.g., by the output thread, by, for example, comparing the program clock reference values associated with the packets to one other, as described above in connection with at least FIGS. 1-4.

For example, at decision point 704, an assessment of the difference between a program clock reference imputable to the first packet in the buffer (in the submitted or output sequence) is compared against the program clock reference imputable to the last packet in the buffer (and in the sequence). The threshold may be set in connection with the techniques described above in connection with FIGS. 1-4, e.g., based at least in part on calculations of duration from HRD buffer occupancy data, and, in some cases, may also include a safety margin above that which is sufficient to prevent buffer underflow and/or overflow for a given output bitrate.

If the PCR difference is above the threshold (or, in some cases, equal to or above the threshold), streaming of the packets out of the output buffer is initiated by the output thread at step 708. However, if the PCR difference is below the threshold (or, in some cases, equal to or below the threshold), at step 706 the streaming does not commence and packets are allowed to continue filtering into the output buffer until such time as the PCR difference of the most recently submitted packet relative to that which was first submitted reaches and/or exceeds the threshold.

Figure 8:
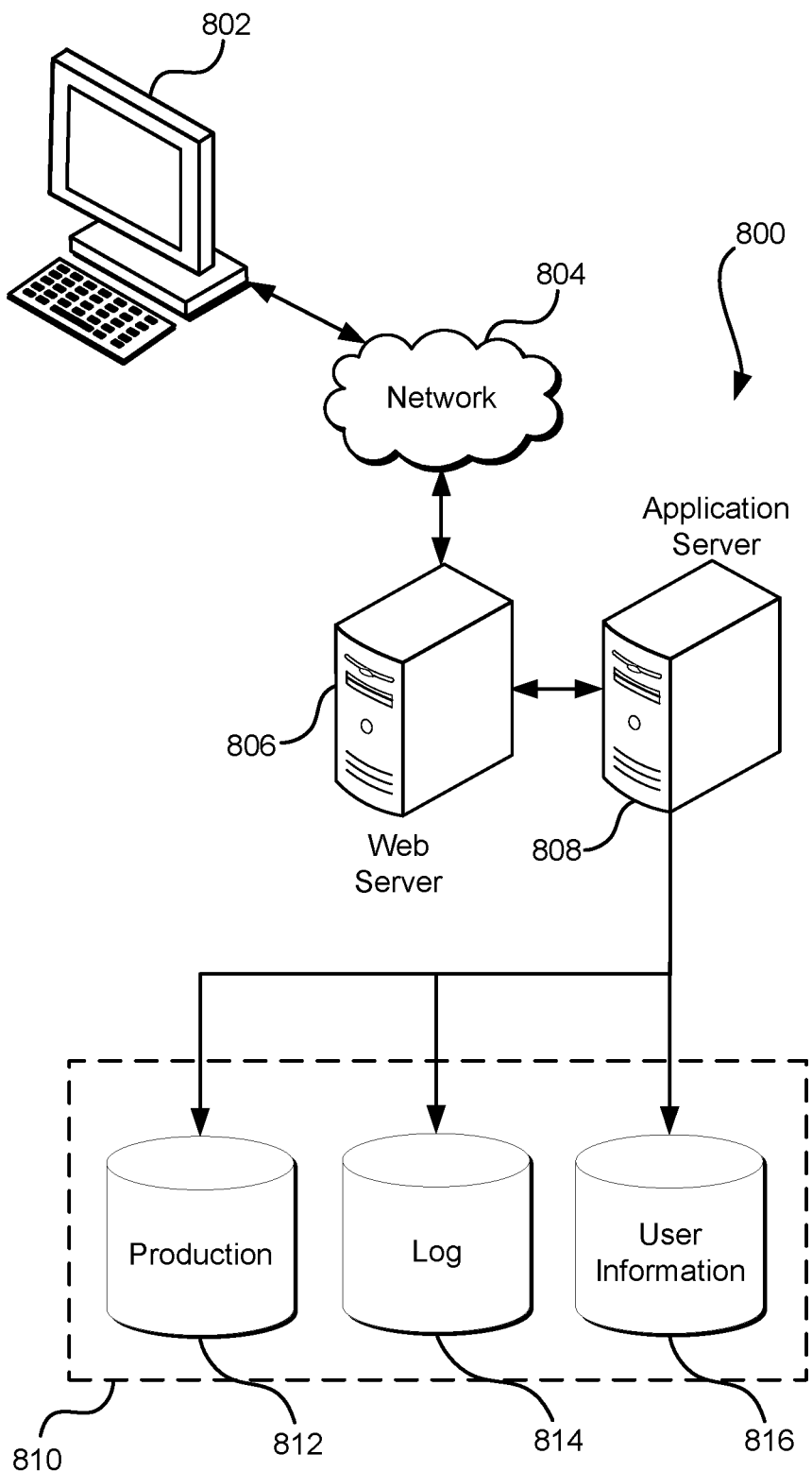
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected.

Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment.

The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of Hyper-Text Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810.

The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server.

In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols.

Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk.

The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof.

The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate.

Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information.

The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening.

Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
encoding a plurality of data packets of decoded data with an encoder comprising a first encoding and a hypothetical reference decoder buffer, the hypothetical reference decoder buffer comprising, based on one or more parameters associated with contents of the plurality of data packets, a residency associated with the plurality of data packets that is inversely dependent on a value of the one or more parameters;
encapsulating the data packets in a set of one or more other packets;
buffering the set of one or more other packets in an output buffer, up to a target duration, wherein size of the output buffer is proportional to the target duration, further wherein, for a first target duration associated with a first residency of the hypothetical reference decoder buffer and a second target duration associated with a second residency of the hypothetical reference decoder buffer:
when the first target duration is greater than the second target duration, the first residency is less than the second residency; and
when the second target duration is greater than the first target duration, the second residency is less than the first residency; and
based at least in part on the target duration, streaming the set of one or more other packets buffered in the output buffer.

2. The computer-implemented method of claim 1, wherein the target duration is calculated based at least in part on a difference between a maximum occupancy of the hypothetical reference decoder buffer and the residency of the hypothetical reference decoder buffer.

3. The computer-implemented method of claim 1, wherein the target duration is determined further based at least in part on a network latency associated with the streaming of the set of the one or more other packets buffered in the output buffer.

4. The computer-implemented method of claim 1, wherein the size of the output buffer is directly proportional to the target duration.

5. A system, comprising:
one or more processors and memory that, as a result of execution, causes the one or more processors to:
for a plurality of data packets of decoded data, encoding the decoded data with an encoder configured with a first encoding and a hypothetical reference decoder buffer that, based on one or more parameters associated with contents of the plurality of data packets, has a residency associated with the plurality of data packets that is inversely dependent on a value of the one or more parameters, encapsulate the data packets in a set of one or more other packets;
configure an output thread to buffer, in an output buffer, the set of one or more other packets up to a target duration, wherein size of the output buffer is proportional to the target duration, further wherein, for a first target duration associated with a first residency of the hypothetical reference decoder buffer and a second target duration associated with a second residency of the hypothetical reference decoder buffer:
when the first target duration is greater than the second target duration, the first residency is less than the second residency; and
when the second target duration is greater than the first target duration, the second residency is less than the first residency; and
forward the set of one or more other packets to the output buffer.

6. The system of claim 5, wherein the memory, as a result of execution, further causes the system to:
determine, based on a first program clock reference of a first packet of the one or more other packets and a second program clock reference of a second packet of the one or more other packets, that a threshold is exceeded; and
as a result of determining that the threshold is exceeded, initiate streaming of the one or more other packets out of the output buffer.

7. The system of claim 5, wherein the memory, as a result of execution, further causes the system to initiate streaming of the one or more other packets out of the output buffer as a result of detecting that occupancy of the output buffer exceeds a threshold size.

8. The system of claim 5, wherein the one or more parameters are related to a complexity of a data payload of the plurality of data packets.

9. The system of claim 8, wherein the data payload includes picture information.

10. The system of claim 5, wherein occupancy of the output buffer is measured in terms of a duration of time represented by picture data within the plurality of data packets.

11. The system of claim 5, wherein the memory, as a result of execution, further causes the one or more processors to buffer the packets in the output buffer based at least in part on the one or more parameters for different incoming pluralities of data packets.

12. The system of claim 5, wherein the size of the output buffer includes an additional duration of time corresponding to a safety margin.

13. A non-transitory computer-readable storage medium comprising executable instructions that, as a result of being executed by one or more processors of a computer system, cause the computer system to at least:
encapsulate a plurality of data packets generated in connection with an encoder configured with a hypothetical reference decoder buffer, the plurality of data packets including picture information;
submit, in a sequence, at least a portion of the plurality of encapsulated data packets to an output buffer with a target duration for the portion of the plurality of encapsulated data packets, wherein size of the output buffer is proportional to the target duration, further wherein, for a first target duration associated with a first residency of the hypothetical reference decoder buffer and a second target duration associated with a second residency of the hypothetical reference decoder buffer:
when the first target duration is greater than the second target duration, the first residency is less than the second residency; and
when the second target duration is greater than the first target duration, the second residency is less than the first residency; and
at a time associated with the target duration, initiate eviction of at least the portion of the plurality of encapsulated data packets from the output.

14. The non-transitory computer-readable storage medium of claim 13, wherein:
the instructions to initiate eviction of the at least the portion of the plurality of encapsulated data packets from the output include instructions that, as a result of execution by the one or more processors, cause the computer system to evict the at least the portion of the plurality of encapsulated data packets from the output at a first rate; and the instructions further include instructions that, as a result of execution by the one or more processors, cause the computer system to evict a different portion of the plurality of encapsulated packets from the output at a second rate that is different from the first rate.

15. The non-transitory computer-readable storage medium of claim 14, wherein the first rate and the second rate are associated with a rate at which packets are submitted to the output buffer.

16. The non-transitory computer-readable storage medium of claim 13, wherein the target duration is measured relative to a duration of the picture information in the plurality of data packets.

17. The non-transitory computer-readable storage medium of claim 13, wherein the time is calculated from a difference between a first program clock reference associated with a first data packet of the plurality of data packets and a second program clock reference associated with a second data packet of the plurality of data packets, the first data packet being an initial data packet submitted to the output buffer, the second data packet being a different data packet later in the sequence and being a most recent data packet submitted to the output buffer when the time is calculated.

18. The non-transitory computer-readable storage medium of claim 13, wherein the plurality of packets are associated with a constant bit rate data stream.

19. The non-transitory computer-readable storage medium of claim 13, wherein the plurality of packets are associated with a variable bit rate data stream.

20. The non-transitory computer-readable storage medium of claim 13, wherein the encapsulated data packets are UDP packets.

* * * * *